3,269,512
CUP ORIENTING MECHANISM
Frank S. Chytil, Santa Clara, Calif., assignor to FMC Corporation, a corporation of Delaware
Filed Nov. 27, 1964, Ser. No. 414,135
7 Claims. (Cl. 198—33)

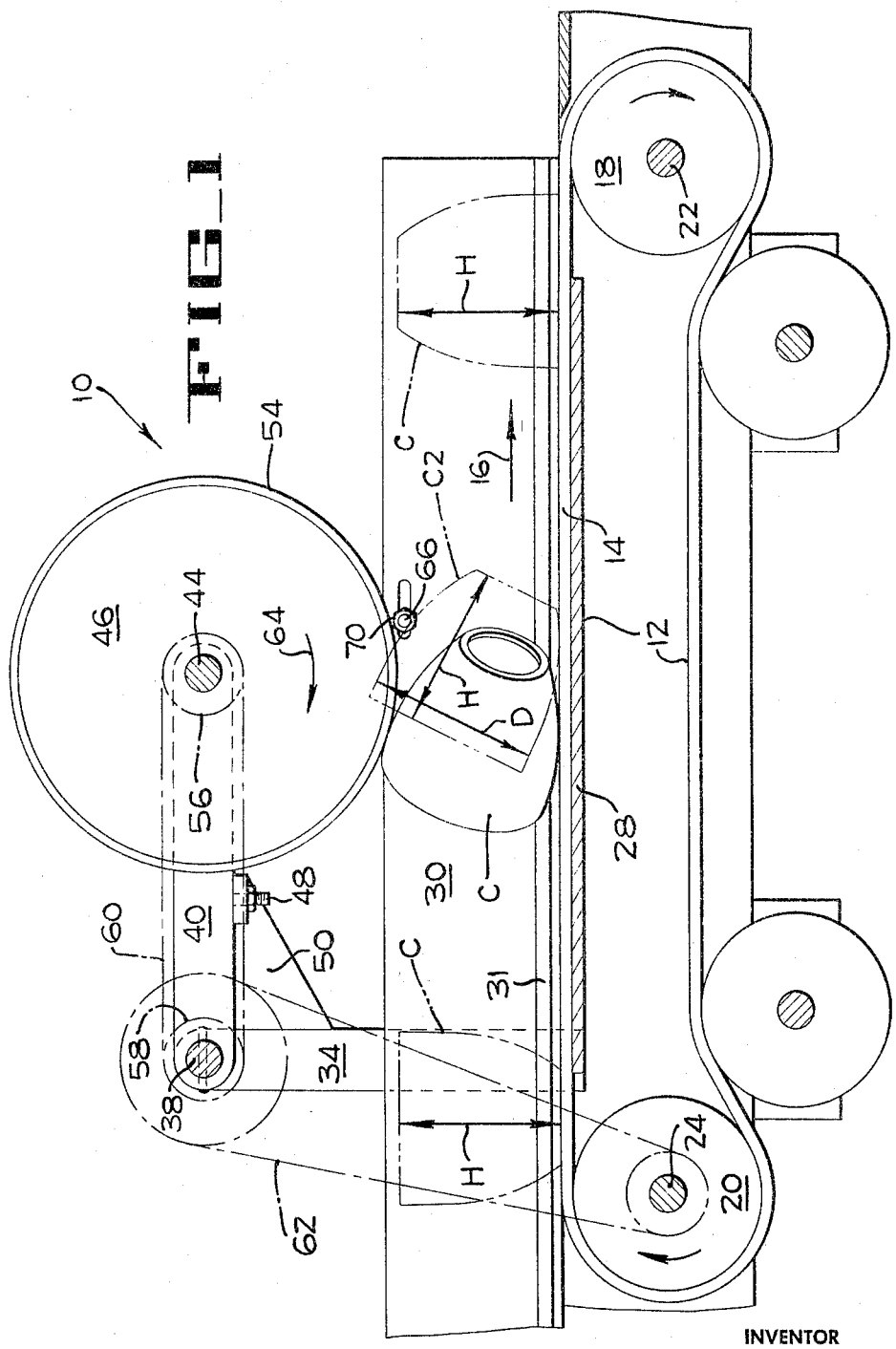

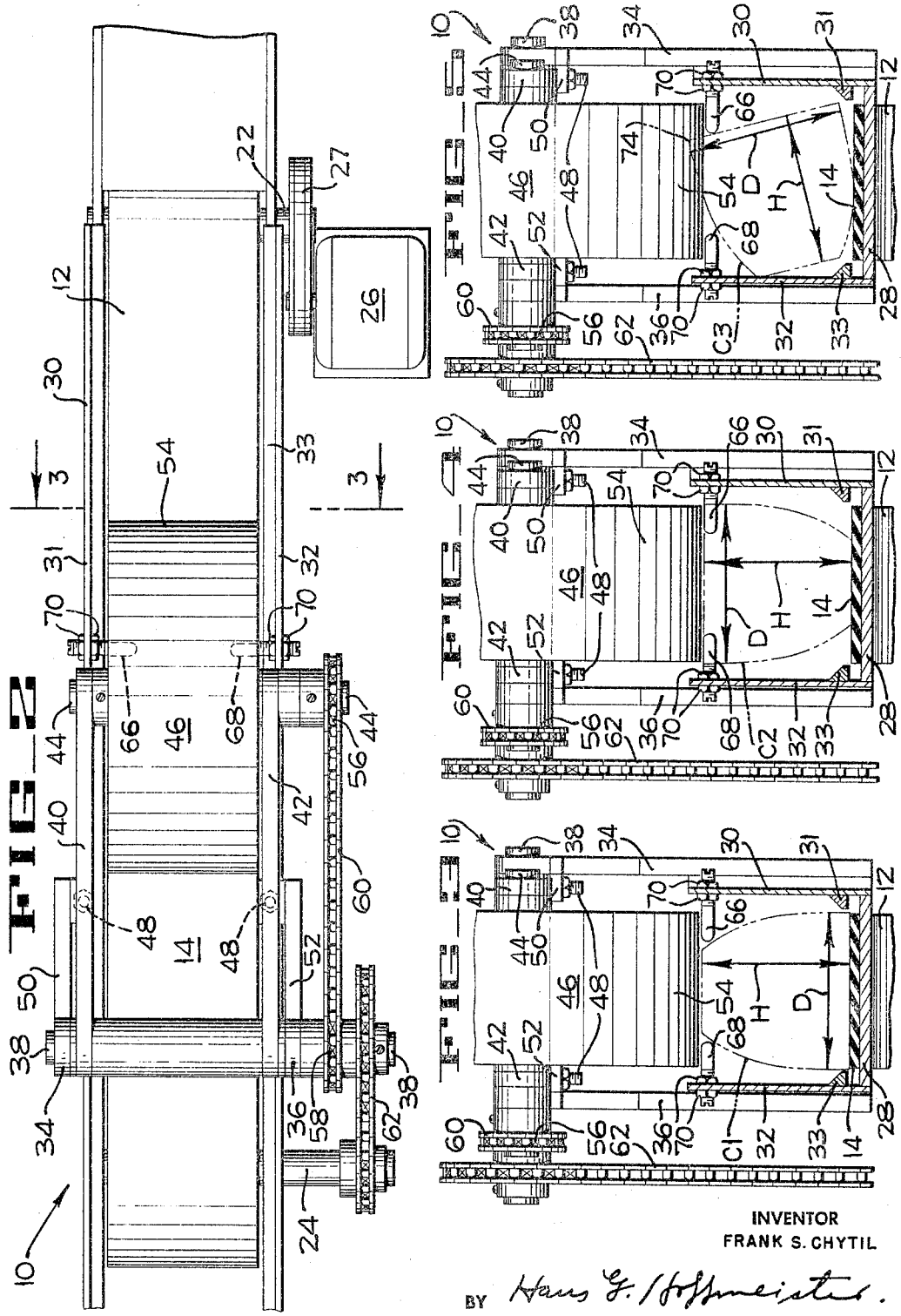

This invention pertains to scullery equipment and more particularly relates to apparatus for orienting cups.

In one type of automatic dishwashing system, soiled cups must be in inverted positions when they are fed into the washing apparatus. The cups are initially fed, by a device which forms no part in this invention, in various random positions into the cup orienting mechanism of the present invention which orients all of the cups to inverted positions for feeding into the washing apparatus.

One object of the present invention is to provide a cup orienting mechanism that reorients cups, on a moving conveyor, from all random positions into uniform inverted positions.

Another object of this invention is to provide a cup orienting mechanism that is capable of distinguishing between correctly oriented cups and incorrectly oriented cups, and which reorients the latter cups rim side down.

A further object is to provide a cup orienting mechanism which maintains a high output rate without chipping or otherwise damaging the cups.

Other objects and advantages of the present invention will become apparent from the following description and from the accompanying drawings, in which:

FIGURE 1 is a schematic longitudinal section through the cup orienting mechanism of the present invention.

FIGURE 2 is a schematic plan of the cup orienting mechanism shown in FIGURE 1.

FIGURES 3–5 are vertical sections all taken along lines 3—3 on FIGURE 2, and particularly illustrate different operational steps in orienting cups which are in other than the desired inverted position.

The cup orienting mechanism 10 (FIGS. 1 and 2) includes an endless conveyor belt 12 having an upper conveying flight 14 which transports cups C in the direction of the arrow 16. The belt 12 is trained about a driven pulley 18 and an idler pulley 20, respectively mounted on shafts 22 and 24 that are rotatably mounted on a floor-supported frame, not shown. A drive motor 26 continuously powers the driven pulley 18 by means of a belt and pulley power train 27.

The upper belt flight 14 is supported by a plate 28 that carries elongate side walls 30 and 32 adjacent each edge of the belt flight 14. Each side wall is provided with a coextensive guide strip 31 and 33, respectively, which have downwardly sloping upper walls that converge toward the upper belt flight 14, as shown in FIGURE 3, and are positioned slightly above a horizontal plane including the upper surface of the belt flight 14. At the upstream side portions of the plate 28, upstanding and laterally aligned legs 34 and 36 rotatably mount a transverse pivot shaft 38. Extending downstream from the pivot shaft 38 are pivot arms 40, 42 which support a driven shaft 44 to which is secured a driven roller 46.

The pivot arms 40 and 42 are supported in their lowermost, generally horizontal positions, by vertically adjustable stop bolts 48. The bolts 48 are mounted in associated brackets 50 and 52 that extend in a downstream direction from the legs 40 and 42 and underlie the pivot arms. Roller 46 is provided with a rough rubber or similar peripheral facing 54 that has a relatively high coefficient of friction, and is laterally centered over the belt flight 14; the width of the roller is such that it fits between the side walls 30 and 32 when the pivot arms 40 and 42 rest upon the stop bolts 48. When thus positioned, the bottom surface of the roller 46 is spaced from the conveyor flight 14 a distance slightly greater than the height H of the cups. The pivot arms 40 and 42 rest on the stop bolts 48 under the force of gravity, and can swing freely upward about the axis of the pivot shaft 38 while the roller is driven.

The roller 46 is driven by a power train including a sprocket 56 secured to the shaft 44, a sprocket 58 which is freely rotatable on the pivot shaft 38, and an endless chain 60 trained around the sprockets. The sprocket 58 is a double unit which includes a drive chain connection 62 to the shaft 24. Because the conveying belt 12 is continuously driven by the motor 26 during operation of the cup inverting mechanism 10, the shaft 24 is thus powered and drives the roller 46 so as to move the lower surface of the roller in an upstream direction, as indicated by the arrow 64 (FIG. 1).

Slightly downstream of the roller shaft 44 (FIGS. 2 and 3) are laterally aligned stop pins 66 and 68 that project inwardly through the side walls 30 and 32 and are each adjustably locked in place by an associated pair of nuts 70 threaded onto exteriorly threaded shanks of the pins. The interspacing of the confronting ends of the stop pins 66 and 68 is less than the major diameter D of the open end portions of the cups C, (but greater than the minor diameter of the cups) and the elevation of the stop pins above the upper belt flight 14 is less than the cup height H. The cup diameter D exceeds its height H. Since the stop pins are thus positioned to engage the exterior surfaces of all cups except those which have their rim portions resting flat upon the belt flight 14, it is preferable that the pins be either non-metallic or sheathed to avoid damaging the cups. One suitable material for the pins or their sheaths is nylon, but it will be evident that other materials such as rubber, plastic and so forth are suitable.

Because the guide strips 31 and 33 (FIGS. 2 and 3) are coextensive within the walls 30 and 32 and slope downward toward the belt flight 14, neither strip can maintain support of a cup which may initially have its rim supported thereon. The inverted cup C1 (FIG. 3) thereby drops to a centralized position on the belt flight 14 wherein the inner ends of the pins 66 and 68 are spaced from the path of the cup and will not later inhibit free travel of the cup upon the belt flight 14. As shown in FIGURE 3, the inverted cup C1 travels under the roller 46, between the pins 66 and 68 and is discharged from the belt near the drive roller 18 in the same inverted position.

In the case of an initially upright cup, such as the cup C2 (FIG. 4), it too will pass freely under the roller 46, but the stop pins 66 and 68 arrest the upper portion of the cup while its lower portion continues to move downstream. The cup C2 thus tips rearward relative to its path of movement, and in so doing its leading rim portion is elevated into contact with the driven roller 46, as shown in phantom lines in FIGURE 1. The cup C2 thus elevates the roller 46, which continues to roll the cup to and beyond a position in which the cup is lying on its side with its open end facing upstream. Since the diameter D of the cup is larger than the space between the lower surface of the roller 46 and the belt flight 14, the roller maintains contact with the cup and continues to roll the cup until it is inverted. During this inverting action the guide rails 31 and 33 center the cup laterally on the belt flight 14, and the inverted cup is now free to progress downstream under the roller 46 and clear of the stop pins 66 and 68.

In the case of a cup entering the cup orienting mechanism 10 lying on its side, as shown by the cup C3 (FIG. 5) its uppermost edge at 74 lies at a higher elevation from the belt flight 14 than does the lower surface of the roller 46 because the dimension D is greater than the dimension H. Accordingly, the edge 74 ultimately contacts the roller 46 at one side of a vertical longitudinal plane bisecting the roller; the cup is accordingly spun on its side so that its open end faces upstream and is laterally centered on the belt flight 14, at which time the roller flips the cup onto its rim portion in the manner previously described, and the thus inverted cup will clear the roller 46 and the stop pins 66 and 68 and be discharged from the downstream end of the conveying flight 14.

If a cup should approach the roller 46 lying on its side and small end first, the upper corner of the rim and side wall engage the roller whereby the cup is immediately flipped onto its rim if the axis of the cup is centered upon the belt flight 14. If the cup is not thus centered, that is, if the cup is moving somewhat sidewise on the belt flight 14, the upper corner of its rim and sidewall will engage the roller 46 at one side or the other of the transverse center of the roller. Thus, in a manner similar to that described for the cup C3 in FIGURE 5, the latter cup will be spun about an upright axis so that its open end faces upstream, and when centered with respect to the roller 46 will be flipped onto its rim.

From the preceding description, it will be seen that all cups oriented otherwise than in the desired inverted position will contact the roller 46 and/or the stop pins 66 and 68, which by separate or combined actions, reposition the cups to uniform inverted positions for eventual feeding into the dishwashing apparatus necessitating such orientation.

While a particular embodiment of the present invention is herein illustrated and described, it will be apparent that modifications and variations may be made without departing from the spirit of the invention, and that the scope of the invention should be limited only by the scope and proper interpretation of the claims appended hereto.

That which is believed to be new, and for which protection by Letters Patent is desired, is:

1. Apparatus for turning moving cups having an outside diameter greater than their height from a position wherein the cups are lying on their sides and with their bases leading to a vertical position wherein the cups stand on their rims, said apparatus comprising a frame, an endless conveyor mounted in said frame, said conveyor having an elongate conveying flight adapted to support a lane of randomly oriented cups, an upright side wall mounted on said frame and projecting upward at each side of said conveying flight, the interspacing of said side walls being slightly greater than the major dimension of said cups, a roller mounted centrally over said conveying flight, said roller being movable upward from a position wherein its lowermost surface is spaced from said flight a distance slightly greater than the height of a cup but slightly less than the diameter of a cup, and power means for driving said roller and said conveyor such that the confronting surfaces of the roller and conveying flight move in opposite directions, said confronting conveyor and roller surfaces thereby turning said cups into a vertical position standing on their rims while said side walls maintain the cups centered beneath said roller.

2. Apparatus for inverting moving upright cups comprising conveying means adapted to support a lane of spaced upright cups, a driven upwardly yieldable roller having an axis of rotation extending across said conveyor and a lower surface spaced from said conveyor a distance slightly greater than the height of a cup, means continuously driving said roller and said conveyor in directions in which their confronting surface move in opposite directions, and a pair of laterally spaced stop pins mounted downstream of said roller transversely of said conveying means, the confronting ends of said pins being spaced apart less than the diameter of the rim portions of the cups but greater than the diameter of the base portions of the cups, said pins being spaced above said conveying means at an elevation less than the height of both upright and inverted cups, the upper end portion of each upright cup thus passing beneath said roller into engagement with said pins whereby the cup tips rearward relative to its path of movement on said conveyor and the leading rim portion of the cup is elevated into engagement with said driven roller, the upper and lower portions of the cup thus being driven in opposite directions whereby the cup is inverted on said conveyor at the upstream side of the roller, again passes beneath said roller, and passes between said stop pins.

3. Apparatus for turning moving cups having an outside diameter greater than their height, from a position wherein the cups are lying on their sides and with their rims leading, to a vertical position wherein the cups are standing on their rims, said apparatus comprising conveying means adapted to support a lane of spaced cups, a driven upwardly yieldable roller having an axis of rotation extending across said conveyor and a lower surface normally spaced from said conveyor a distance slightly greater than the height of a cup but less than the diameter of the cup, means continuously driving said roller and said conveyor in directions in which their confronting surfaces move in opposite directions, and a pair of laterally spaced stop pins mounted downstream of said roller transversely of said conveying means, the confronting ends of said pins being spaced apart less than the diameter of the rim portions of the cups but greater than the diameter of the base portions of the cups and at an elevation less than the height of the cups, the rim portion of the incoming cup engaging said roller so that the rim and base portions of the cup are driven in opposite directions whereby the cup is moved to an upright position on said conveyor at the upstream side of said roller, said upright cup then passing beneath said roller into engagement with said stop pins whereby the cup tips rearward relative to its path of movement on said conveyor and its leading rim portion is elevated into engagement with said driven roller, the upper and lower portions of the cup thus again being driven in opposite directions so that the cup is inverted and is moved downstream clear of said stop pins.

4. Cup orienting apparatus comprising an endless conveyor having an elongate conveying flight adapted to support a lane of randomly oriented cups, a roller mounted over said conveying flight with its lower surface spaced from said flight a distance slightly greater than the height of upright and inverted cups; power means for driving said roller and said conveyor such that the confronting surfaces of the roller and conveying flight move in opposite directions, and a stop pin mounted downstream of said roller at each side of said conveying flight, the interspacing of said pins and the interspacing of said lower roller surface and said conveying flight being less than the outside rim diameter of said cups and said pin interspacing being larger than the outside base diameter of said cups, whereby upright cups are arrested by said pins, inverted cups pass freely between said pins, and cups oriented otherwise engage said roller.

5. Cup orienting apparatus comprising a frame, an endless conveyor mounted in said frame, said conveyor having an elongate substantially planar conveying flight adapted to support a single lane of randomly oriented cups, an upstanding wall at each side of said conveying flight for laterally restraining the cups, an upwardly yieldable roller mounted over said conveying flight, said roller having a lower surface confronting said conveying flight at an elevation slightly greater than the height of a cup, power means for driving said roller and said conveyor such that the confronting surfaces of the roller and conveying flight move in opposite directions, and a stop pin mounted downstream of said roller at each side of said conveying flight on a common axis transversely related to said flight, the spacing between the confronting ends of said pins being less than the major diameter of the cups, said axis intersecting the paths of both upright and inverted cups disposed upon said conveying flight.

6. Cup orienting apparatus comprising a frame, an endless conveyor mounted in said frame, said conveyor having an elongate substantially planar conveying flight adapted to support a lane of randomly oriented cups, each cup having an outside rim portion diameter greater than its height and a smaller diameter base portion, a roller mounted over said conveying flight, said roller being movable upward from a downwardly biased position wherein its lowermost surface confronting said conveying flight is spaced from said flight a distance slightly greater than the height of upright and inverted cups, power means for driving said roller and said conveyor such that the confronting surfaces of the roller and conveying flight move in opposite directions, and a pair of aligned stop pins mounted downstream of said roller and one at each side of said conveying flight on a common axis transversely related to said flight, the interspacing between the confronting ends of said pins being less than the rim diameter of the cups and larger than the base diameter of the cups, said axis intersecting the paths of both upright and inverted cups disposed upon said conveying flight.

7. Cup orienting apparatus comprising a frame, an endless conveyor mounted in said frame, said conveyor having an elongate conveying flight adapted to support a lane of randomly oriented cups, each cup having an outside diameter greater than its height, a roller mounted over said conveying flight, said roller being movable upward from a position wherein its lowermost surface is spaced from said flight a distance slightly greater than the height of a cup but slightly less than the diameter of a cup, power means for driving said roller and said conveyor such that the confronting surfaces of the roller and conveying flight move in opposite directions, and a stop pin mounted downstream of said roller at each side of said conveying flight on an axis transversely related to said flight and intersecting the path of upright cups disposed upon said conveying flight, the interspacing between the confronting ends of said pins being less than the diameter of the cups so that all upright cups travel under said roller and are arrested by said pins, all inverted cups travel under said roller and clear of said pins, and all cups in other than inverted and upright positions are arrested upstream of said pins by engagement with said roller.

References Cited by the Examiner
UNITED STATES PATENTS
2,677,452   5/1954   Mallow _____ 198—33.4

EVON C. BLUNK, *Primary Examiner.*
RICHARD E. AEGERTER, *Examiner.*